(12) United States Patent
Jadallah et al.

(10) Patent No.: US 10,637,760 B2
(45) Date of Patent: Apr. 28, 2020

(54) SYSTEM AND METHOD FOR NETWORK CAPACITY PLANNING

(71) Applicant: SANDVINE INCORPORATED ULC, Waterloo (CA)

(72) Inventors: Anas Jadallah, Waterloo (CA); Scot Loach, Waterloo (CA)

(73) Assignee: Sandvine Corporation, Vancouver, BC (CA)

(*) Notice: Subject to any disclaimer, the term of this patent is extended or adjusted under 35 U.S.C. 154(b) by 275 days.

(21) Appl. No.: 13/799,695

(22) Filed: Mar. 13, 2013

(65) Prior Publication Data
US 2014/0052847 A1 Feb. 20, 2014

Related U.S. Application Data

(60) Provisional application No. 61/691,028, filed on Aug. 20, 2012.

(51) Int. Cl.
*H04L 12/26* (2006.01)
*H04L 12/24* (2006.01)

(52) U.S. Cl.
CPC ........ *H04L 43/0876* (2013.01); *H04L 41/082* (2013.01); *H04L 41/0896* (2013.01);
(Continued)

(58) Field of Classification Search
CPC .... H04W 24/02; H04W 24/08; G06Q 10/063; G06Q 10/06315; G06Q 10/10;
(Continued)

(56) References Cited

U.S. PATENT DOCUMENTS

| | | | | |
|---|---|---|---|---|
| 6,502,131 B1 * | 12/2002 | Vaid | ...................... | H04L 1/1854 709/224 |
| 7,002,960 B1 * | 2/2006 | Golan | ................... | H04L 41/145 370/393 |

(Continued)

FOREIGN PATENT DOCUMENTS

WO 2003107190 12/2003

OTHER PUBLICATIONS

Davy, Alan et. al., "Qos Plan: A Process for QoS-Aware IP Network Planning Using Accounting Data and Effective Bandwidth Estimation".*

(Continued)

*Primary Examiner* — Philip C Lee
*Assistant Examiner* — Patrick F Ngankam
(74) *Attorney, Agent, or Firm* — Gowling WLG (Canada) LLP; Neil W. Henderson (57) ABSTRACT

A method and system for network capacity planning are provided. The method includes: collecting utilization data related to a plurality of network resources on the network; determining a peak period for each of the network resources based on the utilization data; determining at least one key performance indicator (KPI) over the peak period for each of the network resources; aggregating each of the KPIs for each of the plurality of network resources; and outputting the aggregated KPIs. The system includes a data source module configured to collect utilization data related to a plurality of network resources; a peak period module configured to determine a peak period for each of the network resources based on the utilization data; a peak KPI module configured to determine at least one KPI over the peak period for each of the plurality of network resources; a KPI aggregation module configured to aggregate the KPIs for each of the (Continued)

network resources; and a processor module configured to output the aggregated KPIs.

13 Claims, 7 Drawing Sheets

(52) U.S. Cl.
CPC .......... *H04L 41/142* (2013.01); *H04L 41/145* (2013.01); *H04L 43/0882* (2013.01); *H04L 41/147* (2013.01); *H04L 43/062* (2013.01)

(58) Field of Classification Search
CPC .. G06F 11/30; G06F 11/3409; H04L 41/5009; H04L 41/12; H04L 41/5003; H04L 29/06; H04L 29/08072; H04L 41/22; H04L 12/2602; H04L 43/0876
USPC ................................................ 709/224, 223
See application file for complete search history.

(56) References Cited

U.S. PATENT DOCUMENTS

| | | | | |
|---|---|---|---|---|
| 8,296,424 | B2 * | 10/2012 | Malloy | H04L 41/145 709/223 |
| 8,661,104 | B2 * | 2/2014 | Finkelstein et al. | 709/223 |
| 8,676,956 | B1 * | 3/2014 | Johnson | H04L 43/0876 359/206.1 |
| 8,719,627 | B2 * | 5/2014 | Watson et al. | 714/13 |
| 8,958,790 | B2 * | 2/2015 | Carter | H04W 52/24 455/423 |
| 2007/0198802 | A1 * | 8/2007 | Kavuri | G06F 3/0605 711/170 |
| 2010/0015926 | A1 * | 1/2010 | Luff | H04L 41/0604 455/67.13 |
| 2010/0169475 | A1 * | 7/2010 | Woundy | H04L 41/0896 709/224 |
| 2011/0055413 | A1 * | 3/2011 | Lobsenz | G06Q 10/06 709/231 |
| 2012/0166430 | A1 | 6/2012 | Bakalov | |

OTHER PUBLICATIONS

Davy, Alan et. al., "Qos Plan: A Process for QoS-Aware IP Network Planning Using Accounting Data and Effective Bandwidth Estimation", http://www.tssg.org/files/archives/2007_GLOBECOM_davyA_et_al_final.pdf.*
Davy, Alan et. al., "Qos Plan: A Process for QoS-Aware IP Network Planning Using Accounting Data and Effective Bandwidth Estimation", Nov. 26-30, 2007, http://ieeexplore.ieee.org/stamp/stamp.jsp?arnumber=4411420.*
Evans. Et al. "Core Capacity Planning and Traffic Engineering" in "Deploying IP and MPLS QoS for Multiservice Networks", Mar. 23, 2007, http://webspn.hit.bme.hu/~telek/oktatas/konyv2.pdf.*
Davy, Alan et. al., "Qos Plan: A Process for QoS-Aware IP Network Planning Using Accounting Data and Effective Bandwidth Estimation", hereinafter Davy, Nov. 1, 2007, http://brendanjennings.net/papers/2007_GLOBECOM_davyA_et_al_final.pdf.*
John Evans et al: "Core Capacity Planning and Traffic Engineering" In: "Deploying IP and MPLS QOS for Multiservice Networks", Mar. 23, 2007 (Mar. 23, 2007), Morgan Kaufmann Publishers, San Francisco, XP055086562, (Year: 2007).*
Alan Davy et al: "Process for QoS-Aware IP Network Planning Using Accounting Data and Effective Bandwidth Estimation", Global Telecommunications Conference, 2007. GLOBECOM '07. IEEE, IEEE, Piscataway, NJ, USA, Nov. 1, 2007 (Year: 2007).*
Evans "Deploying IP and MPLS QOS for Multiservice Networks", http://webspn.hit.bme.hu/~telek/oktatas/konyv2.pdf (Year: 2007).*
Office Action on corresponding CA patent application No. 2,821,536, dated May 31, 2019.
Evans, John et al., "Core Capacity Planning and Traffic Engineering" in: "Deploying IP and MPLS QOS for Multiservice Networks", Mar. 23, 2007, pp. 375-418, Morgan Kaufmann Publishers, San Francisco.
Davy, Alan et al., "QoSPlan: A Process for QoS-Aware IP Network Planning Using Accounting Data and Effective Bandwidth Estimation", Global Telecommunications Conference, Nov. 1, 2007, pp. 2690-2169, IEEE, Piscataway, New Jersey.
Anonymous, "Class MaximumFinder (ImageJ API)", Oct. 20, 2011, p. 5. Retrieved from https://web.archive.org/web/20111020034902/http://rbsweb.nih.gov/ij/developer/api/ij/plugin/filter/MaximumFinder.html on Nov. 6, 2013.
Sandvine Incorporated, "Sandvine: Sandvine Predicts Streaming to Use 2/3 of Peak Bandwidth in 2015", paragraph [0001]-paragraph [0003]. Retrieved from http://www.snd.vn/news/pr_detail.asp?ID=380 on Nov. 8, 2013.
European Patent Office, Extended European Search Report on EP Patent Appln. No. 13275170.2, dated Nov. 26, 2013.
Anonymous, "What is application?—Definition from Whatis.com", Jun. 1, 2012, XP055222399. Retrieved from http://web.archive.org/web/20120601044234/http://searchsoftwarequality.techtarget.com/definition/application on Oct. 20, 2015.
Sandvine Incorporated, "Global Internet Phenomena Report Fall 2011", Oct. 27, 2011, XP055222471. Retrieved from https://www.sandvine.com/downloads/general/global-internet-phenomena/2011/2h-2011-global-internet-phenomena-report.pdf on Oct. 21, 2015.
Sandvine Incorporated, "Sandvine: Global Broadband Trends", Dec. 12, 2011, XP055222472. Retrieved from https://web.archive.org/web/20111212013217/http://www.sandvine.com/news/global_broadband_trends.asp on Oct. 21, 2015.
European Patent Office, Examination Report on European Patent Appln. No. 13275170.2, dated Nov. 2, 2015.
Infovista, Capacity Planning: Successful Network Bandwidth Management and Quality of Service via Capacity Monitoring and Capacity Planning, Jul. 27, 2012, Infovista, http://www.infovista.com/needs/capacity-planning.
Infovista, Bringing Science to the Art of Backbone Capacity Planning, Jul. 27, 2012, Infovista, http://go.infovista.com/Bringing-Science-to-the-Art-of-Backbone-Capacity-Planning.html?src=http//www.infovista.com/Portals/0/WP_InfoVista_Backbone_Capacity_Planning.pdf&CID=701D0000000ILPd&stat=Download&stat=Download.

* cited by examiner

SYSTEM AND METHOD FOR NETWORK CAPACITY PLANNING

RELATED APPLICATIONS

This application claims priority to U.S. Provisional Patent Application No. 61/691,028 filed Aug. 20, 2012, which is incorporated herein by reference.

FIELD

The present disclosure relates generally to a system and method for network planning. More particularly, the present disclosure relates to a system and method for network capacity planning and optimization.

BACKGROUND

Network traffic volumes generally continue to increase at a rapid pace. On some networks, this increase has been particularly due to the high adoption of services that have high demand for data throughput, for example, video services such as Netflix™ and the like. Because of this increase in traffic volumes, mobile and broadband Internet Service Providers (ISPs) are striving to keep their network capable of delivering the requested content at all times.

The problem of network volumes and capacity typically becomes most important at certain times throughout the day when the network is being used the most, typically called the peak times or period(s). At these times, the high demand for Internet traffic may be more than what the network is capable of (i.e. exceed network capacity), which consequently can result in poor quality of experience for end users/subscribers and, as such, may result into subscriber churn, where disgruntled subscribers may move to a different ISP. For this reason, ISPs typically put a high emphasis on predicting their network growth and planning their capacity and optimization to ensure that their networks have capacity to meet demand even during peak periods.

Capacity planning and optimization decisions are typically driven by budget concerns and general company strategy; these decisions are typically made at senior management levels of an ISP. In some cases, these decisions are made based on data from thousands of network resources serving millions of subscribers. Conventional capacity planning and optimization systems and methods attempt to use overall data volumes and peak period information to predict future network resources.

In network capacity planning, there is an ongoing need to identify the problems with the current approaches and provide improved systems and methods.

SUMMARY

It is therefore desirable to mitigate at least one disadvantage of previous systems and methods for network capacity planning.

According to one aspect herein, there is provided a method of planning in a network, the method includes: collecting utilization data related to a plurality of network resources on the network; determining a peak period for each of the plurality of network resources based on the utilization data; determining at least one key performance indicator (KPI) over the peak period for each of the plurality of network resources; aggregating each of the KPIs for each of the plurality of network resources; outputting the aggregated KPIs.

In a particular case, the method further includes: determining a predicted utilization metric based on the aggregated KPIs and a growth rate.

In some cases, the at least one KPI is application usage of a predetermined application and the method further includes determining the aggregated KPIs and a growth rate for the predetermined application.

In some cases, the method further includes determining a growth rate for each of the KPIs.

In some cases, aggregating of the KPIs is calculated as a weighted average of the KPIs.

In a particular case, the at least one KPI includes network usage per subscriber.

In some cases, the method allows for user-modification of the growth rate.

In some cases, the peak period for the at least one network resource is calculated as a percentile of the peak usage of the resource over a predetermined time interval.

In a particular case, the peak period for the at least one network resource is calculated using time periods adjacent to a peak time comprising usage within 5% of the peak time usage.

In some cases, the method for network capacity planning further includes: creating a network upgrade plan from the aggregated KPIs and the growth rate; refining the network upgrade plan using a KPI based on usage per application to determine the applications driving peak usage; and adapting a per-application network policy to further refine the network upgrade plan.

In some case, this method further includes allowing user-modification of the per-application network policy.

In another aspect, there is provided a system for of capacity planning for a network, having: a data source module configured to collect utilization data related to a plurality of network resources; a peak period module configured to determine a peak period for each of the plurality of network resources based on the utilization data; a peak key performance indicator (KPI) module configured to determine at least one KPI over the peak period for each of the plurality of network resources; a KPI aggregation module configured to aggregate the KPIs for each of the plurality of network resources; and a processor module configured to output the aggregated KPIs.

In some cases, the processor module is further configured to determine a growth rate for the aggregated KPIs.

In some cases, the system further includes: a business intelligence module configured to determine a predicted utilization method based on the aggregated KPIs and a growth rate.

In some cases, the aggregated KPIs include usage by application or include usage by subscriber.

In some cases the system includes an input device for receiving user-modifications for a growth rate.

In some cases, the peak period for the at least one network resource is calculated a as percentile of the peak usage of the resource over a predetermined time interval.

In some particular cases, the peak period for the at least one network resource is calculated using time periods adjacent to a peak time comprising usage within 5% of the peak time usage.

In some cases, the system includes: a business intelligence module configured to create a network upgrade plan from the aggregated KPIs and the growth rate, refine the network upgrade plan using a KPI based on usage per application to determine the applications driving peak usage and further configured to adapt a per-application network policy to refine the network upgrade plan.

Other aspects and features of the present disclosure will become apparent to those ordinarily skilled in the art upon review of the following description of specific embodiments in conjunction with the accompanying figures.

BRIEF DESCRIPTION OF FIGURES

Various aspects of the present disclosure are described below and other aspects and features will become apparent to those ordinarily skilled in the art upon review of the following description of specific embodiments in conjunction with the accompanying figures.

Embodiments of the present disclosure will now be described, by way of example only, with reference to the attached Figures.

DETAILED DESCRIPTION

Generally, the present disclosure provides embodiments of a method and a system for network capacity planning and optimization that provide application specific information in reviewing peak capacity planning issues.

Network optimization and capacity planning for ISPs generally focuses on the peak period and the peak data volume with the goal of having a network that can handle to the peak and the corresponding assumption that the peak period determines the highest volume of internet traffic the ISPs' network should be capable of delivering as well as the corresponding assumption that failing to do so means lower quality of experience and can eventually be translated into subscriber churn.

However, one of the problems that is not considered when dealing with conventional systems and methods for capacity planning is that the systems and methods focus on the peak of overall data usage, without any review or understanding of the nature of the data.

Conventional approaches for network capacity planning generally involve looking at the peak period over the entire network, calculating Key Performance Indicators (KPIs), such as number of subscribers, peak bandwidth usage, the bandwidth per subscriber and the like, and estimating the amount of hardware that is required to support the anticipated future demand on traffic for that period. For example, in a conventional approach the network operator will look at the average usage per subscriber at peak times. So if an operator has sold a high-speed Internet service to 1 million subscribers in a region, and that region has a peak time utilization of 50 Gigabits per second (Gbps), then the average peak subscriber usage is 50 Kilobits per second (Kbps). If the number of subscribers is increasing year-over-year at a rate of 10%, and the bandwidth usage per subscriber is increasing at a rate of 50%, then the operator can project that next year they will require network capacity for 68Kbps per subscriber. This is 65% capacity growth overall, so a conventional approach might be to budget for 65% more network capacity. However, this method has an "averaging" effect such that the KPIs being looked at may not have a true impact at the peak usage of many resources, and possibly not any resources, due to the aggregation of data. Some systems and methods can further provide "what if" analysis in which the system or method may predict the result of further subscribers or services being provided, but this is at the aggregate level.

Figure 1A:
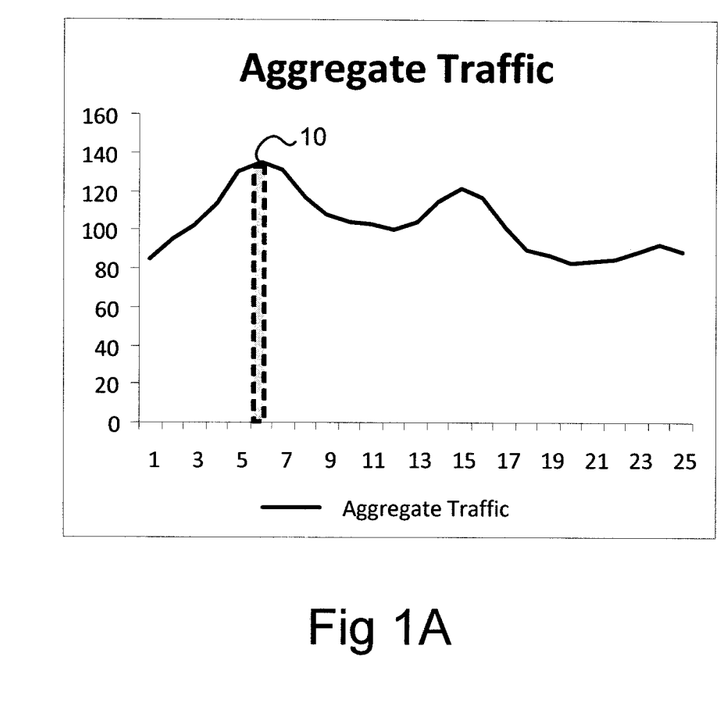
FIGS. 1A and 1B are graphs illustrating the impact of outliers on peak period in network capacity planning.
Figure 1B:
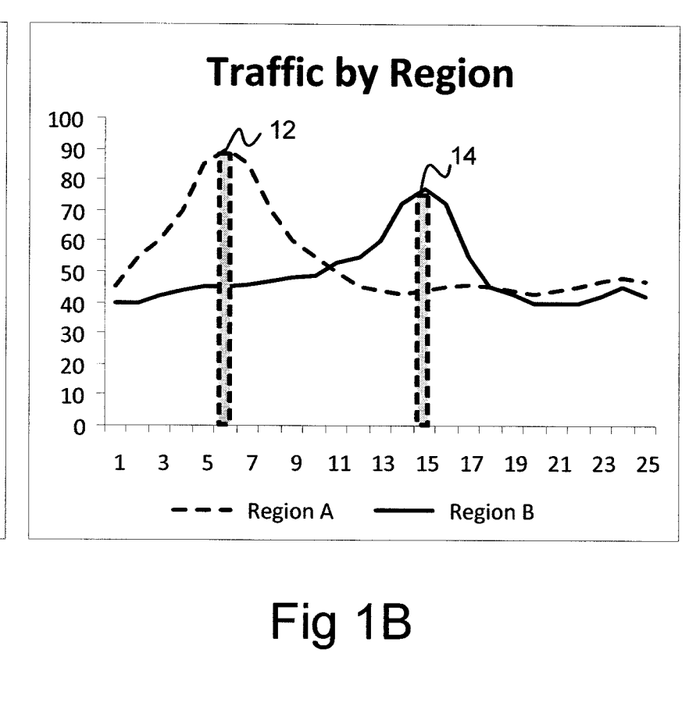

FIGS. 1A and 1B are graphs illustrating a problem in using data aggregation in network capacity planning. Some conventional approaches for capacity planning involve making decisions based on the peak period for aggregate traffic. FIG. 1A illustrates a peak period 10 of traffic for an ISP. This peak period 10, which happens to be for this example the same as peak period 12 for only one region, Region A, as shown in FIG. 1B, the region with the highest traffic consumption across the network. Relying on this data would require designing the network to support peak traffic of 130 kbps per subscriber (sub). On the other hand, some conventional systems actually examine a weighted average consumption of all peaks, which might require supporting, for example, 160 kbps/sub (peak period 12 for Region A plus a peak period 14 for Region B), in order to support the case when all peaks occur at the same time in the future. Relying on the peak for aggregated traffic for capacity planning and optimization decisions is the conventional approach but has the issue of skewing the peak period(s) based on outliers at one region. Internet service providers can take proactive steps in order to prevent outages in their network, when most peaks occur around the same time, by understanding the peak at different regions and planning capacity accordingly.

Figure 2A:
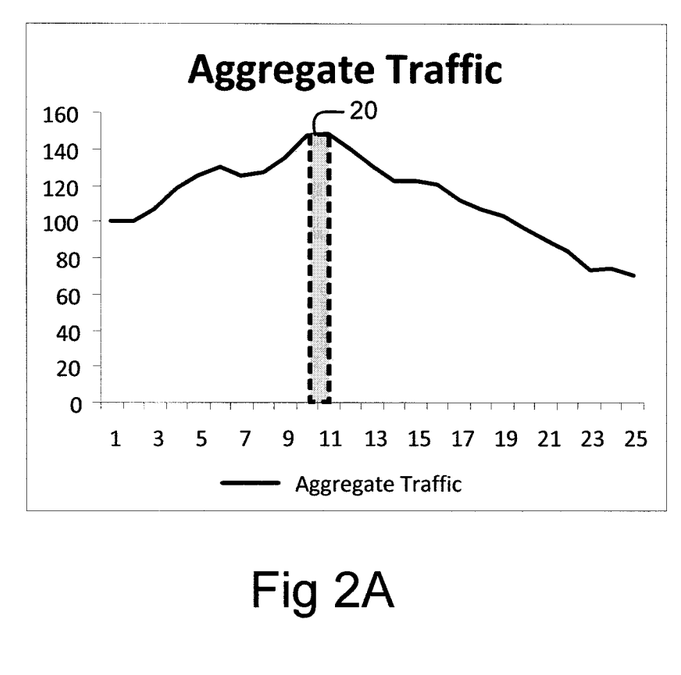
FIGS. 2A and 2B are graphs illustrating peak period shifting due to aggregation in network capacity planning.
Figure 2B:
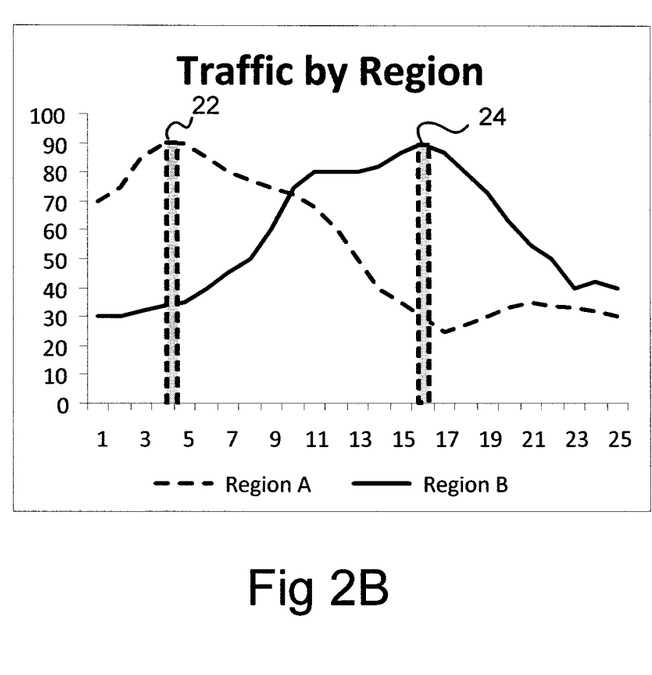

FIGS. 2A and 2B are graphs that illustrate another example where incorrect aggregation of traffic may cause a peak period to be shown even though resource consumption is almost 75% of true peak network usage. FIG. 2A shows the aggregate traffic for the network having a peak period 20 while FIG. 2B shows traffic by region with a peak period 22 for Region A and a peak period 24 for Region B. For example, the bit rate of Region A during aggregate traffic peak period (hour 11) is 68 kbps/sub while its peak bit rate is 90 kbps/ sub (hour 5). In FIG. 2A, the peak period (i.e. aggregate traffic peak period) was caused as a result of averaging traffic, and does not reflect the real peak for each region. This aggregation may result in incorrect network capacity and optimization decisions.

Figure 3A:
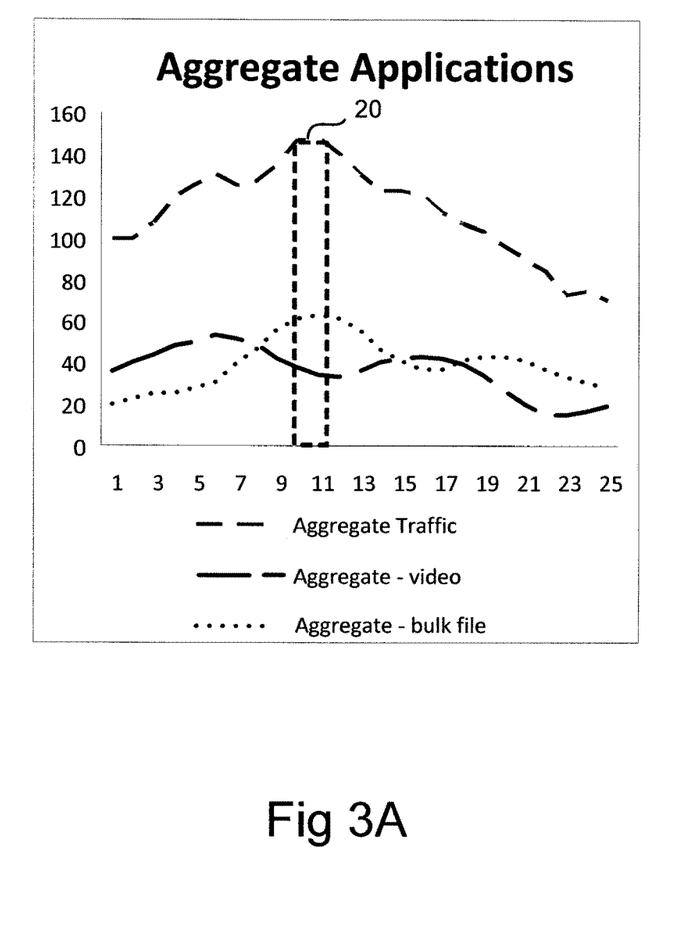
FIGS. 3A and 3B are graphs illustrating peak period for particular applications and regions.
Figure 3B:
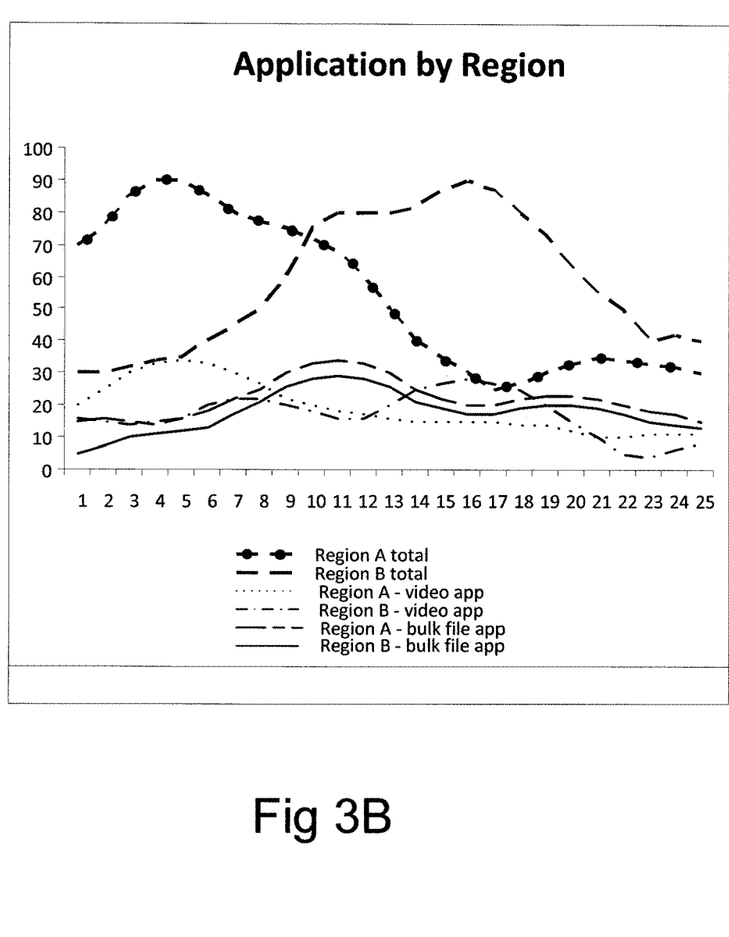

FIGS. 3A and 3B are graphs that show further detail with regard to the graphs shown in FIG. 2A and 2B. As shown in FIG. 3B, a video application was a major factor in the peak period of Region A and Region B, while in FIG. 3A, a bulk file application was the driver for the peak period when looking at the aggregated traffic for all regions.

Relying on FIG. 3A to plan for the capacity of the network would likely make ISPs consider implementing a traffic management solution for the bulk file application across all regions. However, this solution may not solve capacity issues as the video application will remain the driver for the peak period for both regions. On the other hand, relying on regional and application specific peaks instead will allow for mitigation of the peaks by, for example, caching the most popular video content, which should reduce the amount of traffic going through transit links. Also, with this additional data, ISPs might consider peering relationships with video content providers to reduce traffic and costs.

Having recognized the need for a better understanding of what drives peak usage, it is now possible to improve the accuracy of budgeting predictions and to make strategic decisions about how to optimize peak usage to save on capital expenses. Looking at network measurements during network-wide peak times is not sufficient. Therefore there is a need for systems and methods that provide accurate, useful information that is summarized to a level where it enables strategic decisions to be made.

A better understanding of the applications driving peak periods can also lead to alternative or more specific ways of addressing capacity planning and optimization challenges. As noted above, if a video streaming application is found to be the application driving peak traffic, ISPs might implement content caching or consider a peering relationship with the video content provider. On the other hand, if a file sharing application is found to be the top application during a peak period, ISPs might implement a traffic management solution to restrict file sharing traffic, or may consider announcing incentives for subscribers who use file sharing off the peak timing.

Figure 4:
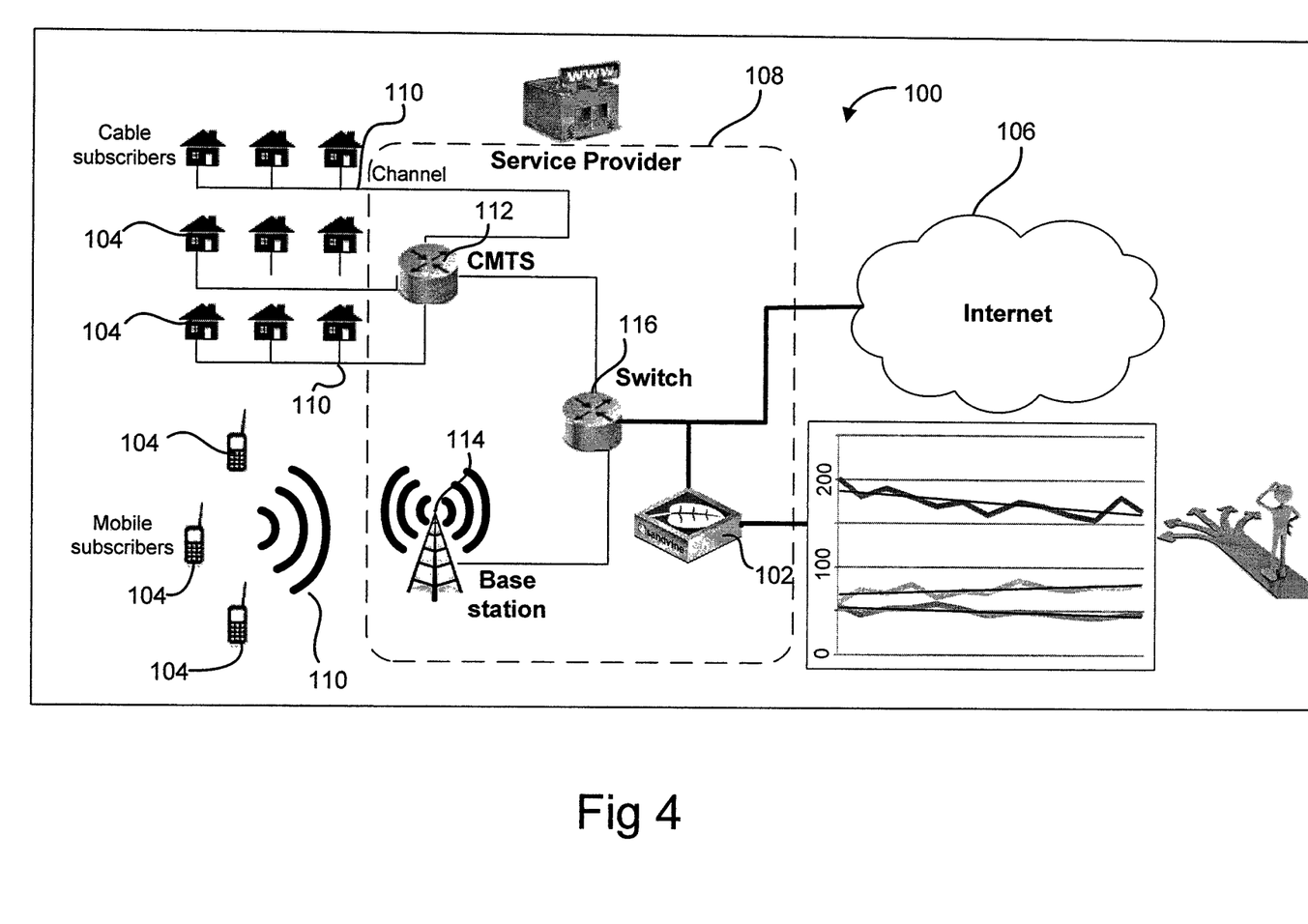
FIG. 4 is a block diagram illustrating an example environment in which an embodiment of a system for network capacity planning is implemented.

FIG. 4 is a block diagram illustrating an example environment 100 in which an embodiment of a system for network capacity planning 102 is implemented. The environment 100 includes a plurality of subscribers 104 connected to the Internet 106 via an ISP network 108. Subscribers 104 connect to the network 108 through a channel 110, which, in this particular example, shares all traffic sent and received by a group of subscribers accessing the Internet 106 from approximately the same physical or virtual neighborhood. Network channel 110 may be wired or wireless, depending on the service provider end points, for example, in this example, wired channels connect to service provider network through a cable modem termination system (CMTS) 112, while wireless channels connect though a base station 114. It will be understood that this environment refers to cable and mobile network but other types of connections and networks may work in a similar way.

Further, the types of network may include various network types or designations, including for example, Local Area Networks (LAN), Wide Area Networks (WAN), Public Switched Telephone Networks (PTSN), mobile networks, the Internet or a combination of various networks. The ISP network 106 will also include various network devices (not shown in detail) that are known in the art, such as a switch 116 and may also include routers, gateways, bridges, hubs, repeaters, or the like, or combinations of devices. The purpose of these network devices is to forward packets across the network from source to destination.

As shown in FIG. 4, the ISP network 108 also includes the system for network capacity planning 102. The system 102 is preferably positioned in the network such that most or all data can be passed to or passed through the system 102 for analysis. However, in some embodiments, a subset of data may pass through the system 102, such as peak period data, and statistical analysis or the like may be used to develop data for use in capacity planning.

In FIG. 4, nine cable subscribers 104 and three mobile subscribers 104 have been illustrated as connected to the network 108 for illustrative purposes. However, in practice, there may be millions of subscribers 104 connecting to the network 108 using various technologies. The system 102 may be a standalone system operatively connected to the network 108 in order to receive data or the system 102 may be included or incorporated into a network device, such as switch 116, or the like. In some cases, the system 102 may be positioned or implemented at an Internet Service Provider (ISP) gateway to monitor data for that ISP. It will be understood that other positions and/or a distributed model are also possible so long as the system 102 is able to monitor traffic.

Figure 5:
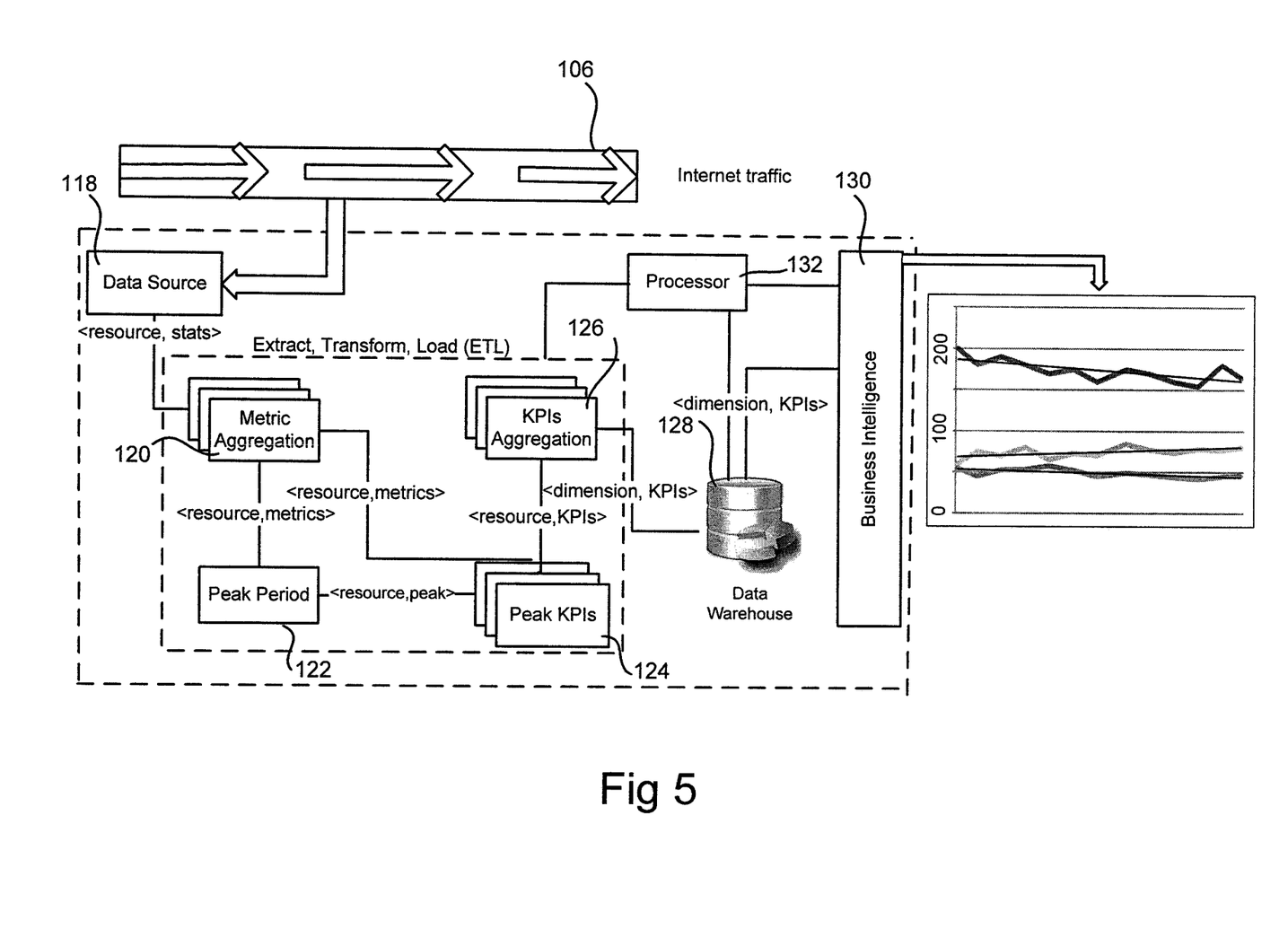
FIG. 5 is a block diagram illustrating a system for network capacity planning.

FIG. 5 is a block diagram illustrating an embodiment of the system 102 of FIG. 4. In this embodiment, the system 102 is positioned to extract data from the flow of traffic to and from the Internet 106. As noted above, this may be all data or some subset of data. The system 102 includes a data source module 118 configured to detect packets and inspect packets to determine attributes and metrics relating to network resources. Examples of resource metrics and attributes include, for example, physical or network location, MAC address of subscriber, number of transmitted bytes or packets, number of received bytes or packets, application protocol, transmission protocol, session protocol, client device, operating system and browser used.

In some cases, the data source module 118 may include one or more of a Cable CMTS sending IP Data Record (IPDR) accounting data, a Deep Packet Inspection (DPI) module inspecting traffic and producing data records for each subscriber, broken down by application, a broadband access router sending RADIUS accounting records or the like. The data source module 118 collects utilization data relating to resource metrics and attributes and transfers the utilization data to a metric aggregation module 120.

In some cases, the system 102 will include a plurality of metric aggregation modules 120, one for each type of metric, as described below. Each metric aggregation module 120 aggregates metrics for all subscribers sharing the same network resource and communicates the results with a peak period module 122 and a peak key performance indicator (KPI) module 124. The peak period module 122 calculates the peak period of resources in the network 108 by, for example, using nth percentile calculations as explained in further detail herein. Other methods may also be used, for example, it is also possible to use a peak time approach rather than a peak period approach, however, a peak period approach tends to assist with removing outliers. The peak period module 122 is configured to transfer peak period data to the peak KPI module 124 in order to assist in filtering peak metrics and calculating KPIs for the peak period. As with the metric aggregation module 120, there may be embodiments where a plurality of peak KPI modules 124 are provided in order to handle various KPIs.

The peak KPI module 124 receives aggregated values for resource metrics for all sampling intervals from the metric aggregation module 120 and uses the peak period start and end time received from the peak period module 122 in order to filter metrics related to the peak period. The aggregated metrics for the peak period are used to calculate KPIs for network resources. In particular, it can be beneficial to calculate the KPIs for each resource and the metrics associated with each resource can be filtered by the peak period of that resource.

The KPI aggregation module 126 is operatively connected to the peak KPI module 124 and configured to calculate KPIs for higher levels in the network hierarchy by aggregating KPIs for various network resources. In this example, these calculated KPIs indicate the demand for network traffic during the peak period for a group of network resources in the same hierarchal level. The KPI aggregation module 126 is further operatively connected to a data warehouse 128, which stores daily records of peak KPIs across different levels in the network hierarchy. The data warehouse 128 can then be accessed by a business intelligence module 130.

The business intelligence module 130 extracts data for aggregated KPIs from the data warehouse module 128 and outputs the data, for example, in graphical format, in order to provide historical, current and predictive views of peak periods and their impact on different levels in the network 108, which enables ISPs to make network capacity planning and optimization decisions. For example, one predictive technique is to look at the historical trend of a KPI, and use, for example, a mathematical model such as a linear regression to project the KPI into the future. Another predictive technique is to allow the user to input growth projections, via an input device (not shown), such as target subscriber growth for the following year, and use that to predict other KPIs such as the expected peak usage next year.

The system 102 further includes a processing module 132. The processing module 132 is configured to execute instructions received by the modules of the system 102. In some cases, each module may include at least one processing module. In other cases, the processing module may be a central processing unit of a network device hosting the system 102, and may be operatively connected to the modules of the system 102.

Figure 6:
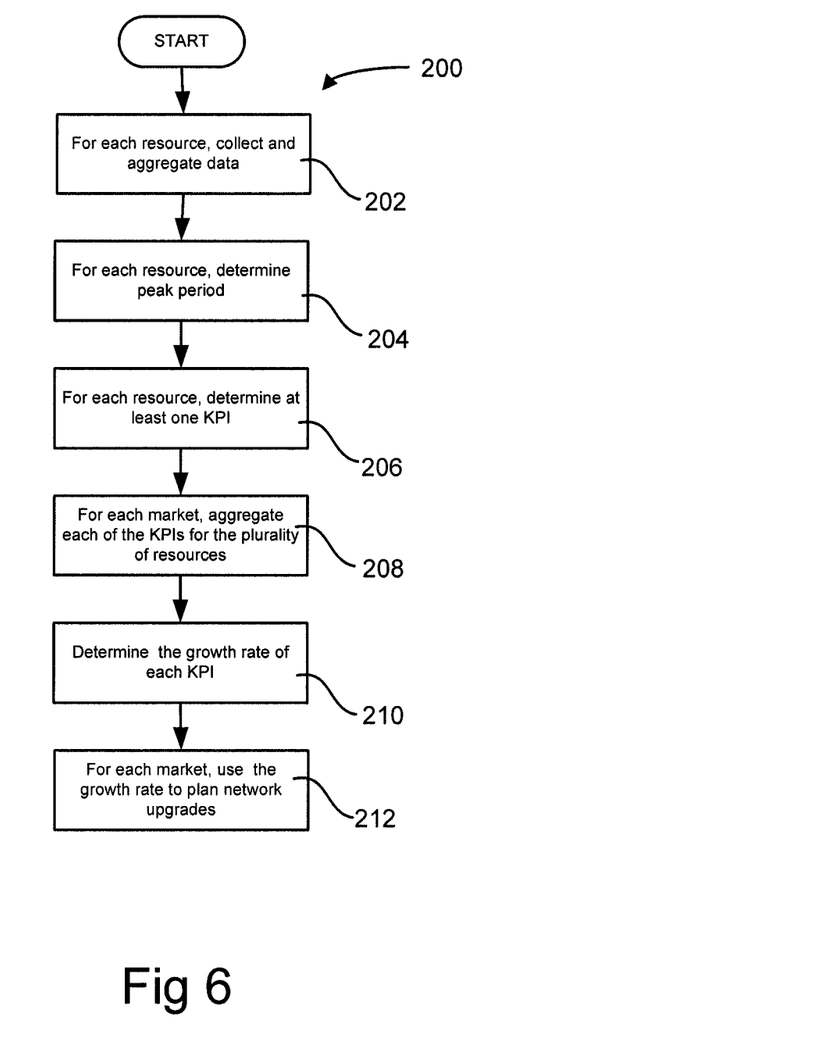
FIG. 6 is a flowchart of an embodiment of a method for network capacity planning.

FIG. 6 is a flowchart of an embodiment of a method for network capacity planning 200. This method 200 is intended to be performed by the system 102 of FIG. 5. The method 200 shown in FIG. 6 also occurs following the gathering of utilization data, for example, by data source module 118.

At 202, the time of peak usage (sometimes referred to as "peak time") of each network resource in a plurality of network resources is collected and aggregated. The data may be collected by the data source module 118 and transferred to the metric aggregation module 120 where the metrics relating to the peak time are aggregated.

In this context, a network resource is generally defined as a resource with a limited capacity that the ISP is trying to optimize and, in some cases, can be the lowest level resource that has data that can be measured. For example, in a cable network, the network resource for optimization may be a cable channel or a physical interface on the CMTS. In another example, if expanding capacity means a need to expand the number of router ports, then it would be preferred to measure the peak time at the level of a router port. In general, ISPs will be interested in resources in the network that must be expanded every year as Internet traffic grows due to new subscribers and higher use of bandwidth per subscriber.

The peak time of a resource is generally calculated by looking at usage metrics for the resource over some historical period; the period should be long enough to capture regular peaks in the traffic due to events that drive higher usage, such as, for example, special news events or weekends. In one example, to avoid using data based on an exceptional outlier event such as a one-time news event or a rare sporting event that drove exceptionally high traffic, the 95th percentile may be used instead of the peak value. It will be understood that other percentiles may also be used where appropriate. For the purposes of an example, the peak time of each resource can be calculated as follows:
1. Create a table of the bytes received on that resource for each 15-minute period over the past 7 days. The table will have 672 rows.
2. Sort the table in ascending order of bytes received.
3. The 95th percentile peak time will be the 638th row of the table. The peak time is that 15-minute interval.

It will be understood that the 15-minute period may be any other appropriate period, keeping in mind that shorter periods, such as 5 minutes, will generally result in higher peak usage data, since the data will be averaged over a shorter time interval and similarly, longer periods, such as 1 hour, will have lower peak usage data, since short-term peaks will be smoothed out more. Generally speaking, the period may be determined by the data collection technology, as well as business decisions on how "aggressively" the network should be built to satisfy short-term peaks in bandwidth demand.

Next, at 204, a peak period of each network resource is determined by the peak period module 124. The peak period is a period surrounding the peak time that represents a longer period of peak usage. In one embodiment, this may be calculated by including all time periods adjacent to the peak time that have usage within 5% of the peak time usage. In this example, the peak period of the resource can be calculated as follows:
1. Using the table created for determining the peak time, flag the peak time and re-order the table by date and time.
2. Starting at the peak time determined above, walk forward through the table. For each row, if the received bytes are at least 95% of the received bytes for the peak period, include that interval in the peak period. Stop when a row does not meet the criteria.
3. Starting at the peak period calculated above, walk backward through the table. For each row, if the received bytes are at least 95% of the received bytes for the peak period, include that interval in the peak period. Stop when a row does not meet the criteria.
4. The peak period is the period of time starting at the earliest row found in 3 and ending at the latest row found in 2.

Using this type of peak period rather than a smaller peak time is intended to provide a larger sample of data than a single smaller interval. The additional data is intended to make it more likely that the KPIs will measure a representative sample of network usage.

At 206, an average of at least one KPI for each resource is determined over the peak period for each of the plurality of network resources by the peak KPI module 124. In this embodiment, the KPIs are measured at the level of a network resource, so they can be more precisely extracted and analyzed. One example of a useful KPI is usage per subscriber. This KPI can be averaged to provide an average usage per subscriber during the peak period. Other examples of useful KPIs include, for example, usage per application or a quality of experience metric (QoE), such as round-trip time, Voice over Internet Protocol (VoIP) mean opinion score (MOS), and video quality of experience score. While this embodiment refers to "averaging of each KPI", it will be understood that other techniques may be used to aggregate metrics over time in other ways, such as taking a maximum, sum, standard deviation, or other available and appropriate aggregation method.

At 208, the averaged KPIs are aggregated 208 to a market level by the KPI aggregation module 128. The aggregation is done to express the KPIs as higher-level numbers that may be more useful for broader decision making. In this context, a market may be an administrative division of the ISP, a geographical region, the entire network owned by an ISP, or any other grouping of network resources which makes logical sense.

In some cases, this aggregation may be done using a weighted average, where, for example, the traffic volume or number of subscribers at each network resource is used as a weighing factor. For example, to calculate the weighted average of the usage per subscriber KPI, at each resource this metric is multiplied by the number of subscribers provisioned on that network resource. Then these weighted numbers are added together and divided by the total number of subscribers on all network resources in the market. This calculation is intended to adjust so that the number of subscribers on a network resource does not affect the outcome of a per-subscriber metric. The aggregation at this level may also use other types of aggregation functions other than weighted average to produce a single meaningful number from the KPIs measured at the network resource. For example, for some KPIs, such as number of subscribers, it may not be appropriate to use a weighted average or the like and this KPI would just be the sum of subscribers for each resource in the region.

The aggregated results can then be analyzed over a predetermined time period by the business intelligence module 130 and used to determine 210 a growth rate for each KPI. A regression analysis, such as a linear regression, may be used to project future growth rate based on a series of past data points. For example, the trend over the past year might be a good sample to predict the next year. A longer sample, such as the past 3 years of data, might provide a more accurate projection. Weekly or monthly data points within this time range could also be used to build the growth rate.

Alternatively, the nth root of the total percentage growth rate can be calculated, where n is the number of years of historical data, and the growth rate is expressed as a compound annual growth rate (CAGR). In another alternative, a graph of the historical data can be displayed and a user may estimate the growth rate from this graph. Other ways of calculating growth rate may also be used, and one skilled in the art may choose based on the shape of the historical data and on general accepted ways to express the growth rate of network usage data.

The result of the above is a plurality of KPIs expressed at the market level and a growth rate related to each. These market-level KPIs and growth rates can be analyzed in various ways to assist with network capacity planning. The following procedures outline one example of how these KPIs can be analyzed and, where needed, output for use in capacity planning, although there are many alternative uses of the data.

As an example, the following Table 1 provides KPIs that are representative of one market that has been analyzed using the method 200.

TABLE 1

| West Market | | | |
|---|---|---|---|
| Total Subscribers: | 1,000,000 | | |
| Total Capacity (Gbps): | 75 | | |
| Peak Period KPIs | | | |
| Application | KPI | Value | Growth Rate (%) |
| All Traffic | Adoption (%) | 100 | 0 |
| | Avg Kbps/Sub | 50 | 50 |
| Movie Streaming Site | Adoption (%) | 70 | 10 |
| | Avg Kbps/Sub | 20 | 3 |
| Short Video Site | Adoption (%) | 75 | 1 |
| | Avg Kbps/Sub | 15 | 2 |
| Web Browsing | Adoption (%) | 95 | 0 |
| | Avg Kbps/Sub | 10 | 10 |
| Social Networking | Adoption (%) | 90 | 15 |
| | Avg Kbps/Sub | 2 | 5 |

An average peak usage per subscriber may be multiplied by the growth rate of average peak usage per subscriber to determine a utilization metric, for example, a predicted percentage of utilization, such as a peak usage number that predicts per-subscriber peak usage in the following year. The total capacity available in the market per subscriber, which is defined as the sum of the capacity of all resources divided by the number of subscribers in the market, is then divided by the peak usage number. The result is the average percentage of utilization without any capacity upgrades.

Typically, an ISP has a goal to keep utilization at a certain level, such as 70%, to allow for unexpected increases in utilization. So using this predicted percentage of utilization vs. a desired percentage, the budget for network capacity upgrades in the next year can be calculated. In the West Market example, the network is current running at 67% of capacity (1 million subscribers, 50 Kbps per subscriber, 75 Gbps capacity). Given the 50% growth rate of total traffic, next year this network would be at 100% of capacity without any capacity upgrades. Therefore to keep the network within the 70% capacity range, an additional 32 Gbps of capacity would need to be added.

After completing the percentage of utilization analysis and determining the utilization metric, a market-wide budget can be set from usage metrics that are based on resource-level network measurements. This is intended to provide an accurate planning estimate if the projected growth rate accurately predicts the future. At 212 in the method 200, the growth rate predicted may be used to plan network upgrades for each market. However, the following procedures may provide a deeper analysis of what is driving peak network usage, and therefore network cost, to help refine the growth predictions.

Figure 7:
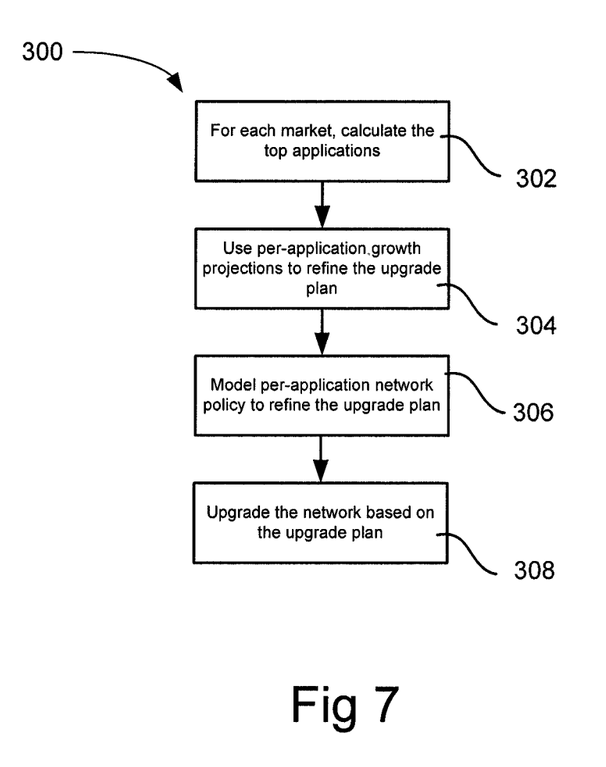
FIG. 7 is a flowchart of a method for refining a network capacity plan.

FIG. 7 is a flowchart of an embodiment of a method 300 for refining network capacity planning, which may be used to refine a network capacity plan once the growth rate has been determined from the aggregated KPIs. In one example, at 302, the application usage KPIs calculated above can be summarized into an application usage report that determines the top applications on the network during peak periods of usage and the historical growth rate of these applications. It should be noted that this application usage report is intended to show the true top applications during peak times; a report that is based on overall network measurements during the peak time of the entire market may be misleading, since the overall network peak may not match the peak period of specific network resources. The application usage report may be, for example, a table showing the top 20 applications on the network during the peak period along with the average bitrate and annual growth rate of each application, ordered by average bitrate.

Alternatively, the application usage report may be a collection of graphs, with one graph per application (in some cases, the words protocol and application may both be used since some applications will work on a particular protocol), where each graph has days on the X axis and subscriber adoption on the Y axis to visually show the subscriber adoption and growth rate of each application. In the above West Market KPI report, KPIs are shown for the top five applications on the network. The top application is a Movie Streaming application/site. This is a paid subscription-based site where subscribers can stream popular movies to devices in their home. The second application is a Short Video site. This is a free site where users can share videos they have created, and watch videos other users have shared. The third application is general web browsing, the fourth application is Peer to Peer traffic, and the fifth application is Social Networking. These five applications (or, in some cases, groups of applications under a protocol, or the like) characterize the majority of the traffic driving peak network utilization for the market.

At 304, the application usage report may also be analyzed and, where necessary, adjusted by a user of the or by predetermined policy settings stored in the data warehouse 128 of the system 102. The top applications are researched to try to understand whether the growth rate for any application should be modified. In an example, the top application may be a streaming video service that has been growing at a rate of 50% for the past two years. A KPI on subscriber adoption of this service indicates that the network usage has been growing at the same rate as the number of subscribers using the application, and that the percentage of subscribers using the application is nearing saturation. Therefore, the growth rate for this application can be modified down, which will lower the expected growth rate of overall network growth for the market next year.

In another example, if market research indicates that a popular video sharing application is going to convert all of its movies from standard-definition to high-definition in the next year, the difference in network usage from this change can be predicted, and this information can be used to adjust the expected growth rate of this application to raise the expected growth rate of overall network use for the market next year. Returning to the West Market example, the top application grew by 10% in the past year, and is now at 70% adoption. Since this is a paid service, an assumption could be made that this will not grow much further beyond 70%. Since this application makes up 40% of peak traffic, the growth rate for next year can be adjusted down by 40%. As a result, the budgeted growth can be modified down to 18 Gbps of additional capacity instead of the original estimate of 32 Gbps that was projected from the total traffic. The adjustment to growth rate and additional capacity could also be automated; for example, a "peak adoption" could be estimated and input for a paid or non-paid application, and the overall growth rate could be modified by taking this peak adoption number into account.

As a part of the budgeting and capacity planning, at 306 the user may also consider using network policy planning for the next year to further refine the capacity planning model. Adjusting for application growth is a refinement of the model based on additional information, while network policy planning is a plan of action to influence network traffic based on the generated application usage report. For example, if peer-to-peer file sharing traffic is a significant percentage of peak usage, an ISP may implement a policy that rewards subscribers for keeping their peer-to-peer traffic outside peak hours, to try to reduce this traffic, resulting in a lower growth rate and therefore a savings in capital expenditures for network upgrades. In the West Market example, the fourth application is peer-to-peer traffic. The operator chooses to implement an incentive scheme where peer-to-peer traffic will not count against a user's quota if they give permission for the operator to throttle it during congestion. The operator estimates that 80% of Peer-to-Peer users will take this option, so peer-to-peer traffic should drop from 5 Kbps/subscriber to 1 Kbps/subscriber during peak times. This is a savings of 8% of peak traffic. As a result, the budgeted growth can be further modified down to 14 Gbps of additional capacity instead of the original estimate of 32 Gbps that was projected from the total traffic.

At 308, the system 102 is configured to execute the upgrade plan to expand the network capacity. This may involve procurement and installation of network equipment, installation of new cables, and the creation of new business agreements for backhaul capacity and Internet transit capacity. It will be understood that the methods for network capacity planning and refining a network upgrade plan are not limited to the options detailed above and may include other aspects or other KPIs that may influence and be included in capacity planning and in an upgrade plan.

The embodiments disclosed herein are intended to support capacity planning for networks by providing tools and procedures to gather and present new types of data and overcome the problem of insight into peak time data. The embodiments of the system and method are also intended to provide forecasts of future growth for a number of variables, including, for example, projected Kbps per sub by application for a period under investigation, and presents this data to support network optimization and capacity planning decisions.

The embodiments of the system and method for network capacity planning and optimization described herein are intended to be efficient, scalable and adaptable for use in various types and sizes of networks.

In the preceding description, for purposes of explanation, numerous details are set forth in order to provide a thorough understanding of the embodiments. However, it will be apparent to one skilled in the art that these specific details may not be required. In other instances, well-known structures are shown in block diagram form in order not to obscure the understanding. For example, specific details are not provided as to whether aspects of the embodiments described herein are implemented as a software routine, hardware circuit, firmware, or a combination thereof. Embodiments of or elements of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope described herein.

We claim:

1. A method of capacity planning in a network, the method comprising:
   collecting utilization data, via a data source module, related to a plurality of network resources on the network;
   determining a peak period, via a peak period module, for each of the plurality of network resources based on the utilization data, wherein a peak time for each of the plurality of network resources is calculated as a percentile of a peak usage of the network resource over a predetermined time interval and wherein the peak period for each of the plurality of network resources is calculated using time periods adjacent to the peak time comprising usage within 5% of the peak usage;

determining, via a peak KPI module, a plurality of key performance indicators (KPIs) over the peak period for each of the plurality of network resources, wherein the plurality of KPIs comprises application use of each of a plurality of applications on the network;

determining at least one top application of the plurality of applications on the network during the peak period based on the plurality of KPIs to generate an application usage report;

aggregating, via a KPI aggregation module, each of the KPIs for each of the plurality of network resources;

determining, via a processor, the aggregated KPIs and a growth rate for each of the plurality of KPIs and a total capacity per subscriber for a plurality of subscribers of the network;

creating a network upgrade plan, wherein the network upgrade plan comprises at least an upgrade plan for each of the plurality of network resources, via a business intelligence module, based on the generated application usage report, the aggregated KPIs, the growth rate for each of the plurality of KPIs, and the total capacity per subscriber for the plurality of subscribers of the network; and implementing the network upgrade plan.

2. The method of claim 1 further comprising:
determining a predicted utilization metric based on the aggregated KPIs and the growth rate.

3. The method of claim 1, wherein the aggregating of the KPIs is calculated as a weighted average of the KPIs.

4. The method of claim 1, wherein the plurality of KPIs comprises network usage per subscriber.

5. The method of claim 1 further comprising allowing user-modification of the growth rate.

6. A system of capacity planning for a network, the system comprising:
a data source module configured to collect utilization data related to a plurality of network resources;
a peak period module configured to determine a peak period for each of the plurality of network resources based on the utilization data, wherein a peak time for each of the plurality of network resources is calculated as a percentile of peak usage of the network resource over a predetermined time interval and wherein the peak period for the at least one network resource is calculated using time periods adjacent to the peak time comprising usage with 5% of the peak usage;

a peak key performance indicator (KPI) module configured to:
determine a plurality of KPIs over the peak period for each of the plurality of network resources, wherein the plurality of KPIs comprises application use of each of a plurality of applications; and
determine at least one top application of the plurality of applications on the network during the peak period based on the plurality of KPIs to generate an application usage report;

a KPI aggregation module configured to aggregate the KPIs for each of the plurality of network resources;

a business intelligence module configured to create a network upgrade plan, wherein the network upgrade plan comprises at least an upgrade plan for each of the plurality of network resources, based on the generated application usage report, the aggregated KPIs, a growth rate for each of the plurality of KPIs and a total capacity per subscriber for a plurality of subscribers of the network and implement the network upgrade plan; and a processor configured to execute a set of instructions performed by the data source module, the peak period module, the peak KPI module, the KPI aggregation module and the business intelligence module and to determine the growth rate for each of the plurality of KPIs.

7. The system of claim 6 further comprising:
a metric aggregation module configured to aggregate utilization data collected by the data source module.

8. The system of claim 6, wherein the business intelligence module is further configured to determine a predicted utilization metric based on the aggregated KPIs and the growth rate.

9. The system of claim 6, wherein the plurality of KPIs comprises usage by subscriber.

10. The system of claim 6 further comprising:
an input device for receiving user-modifications for the growth rate.

11. The method of claim 1 wherein creating the network upgrade plan further comprises creating a budget for network capacity upgrades.

12. The method of claim 1 further comprising determining a peak adoption for each of the at least one top application and wherein creating the network upgrade plan is based at least in part on the peak adoption for each of the at least one top application.

13. The method of claim 1 wherein creating the network upgrade plan comprises creating traffic management solutions wherein the traffic management solutions comprise caching content; subscriber incentives; network resource upgrades; and incentive schemes.

* * * * *